R. BACKUS.
Improvement in Base Burning Stoves.
No. 120,229. Patented Oct. 24, 1871.
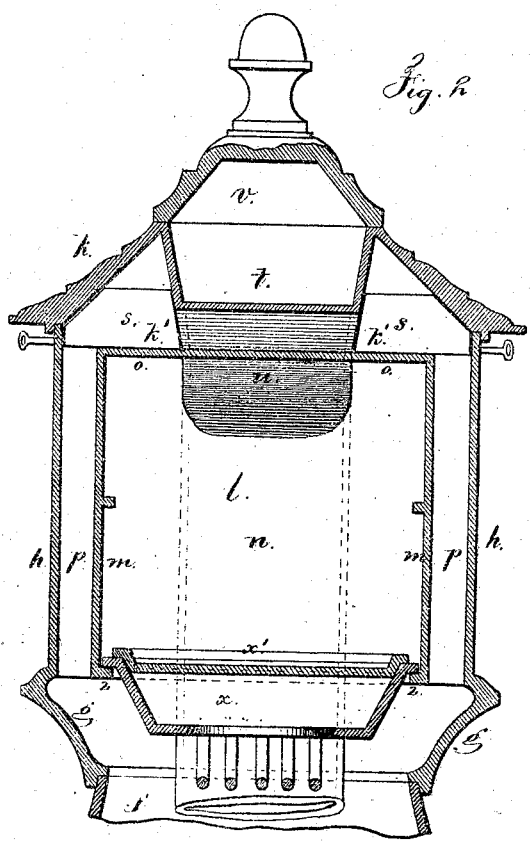

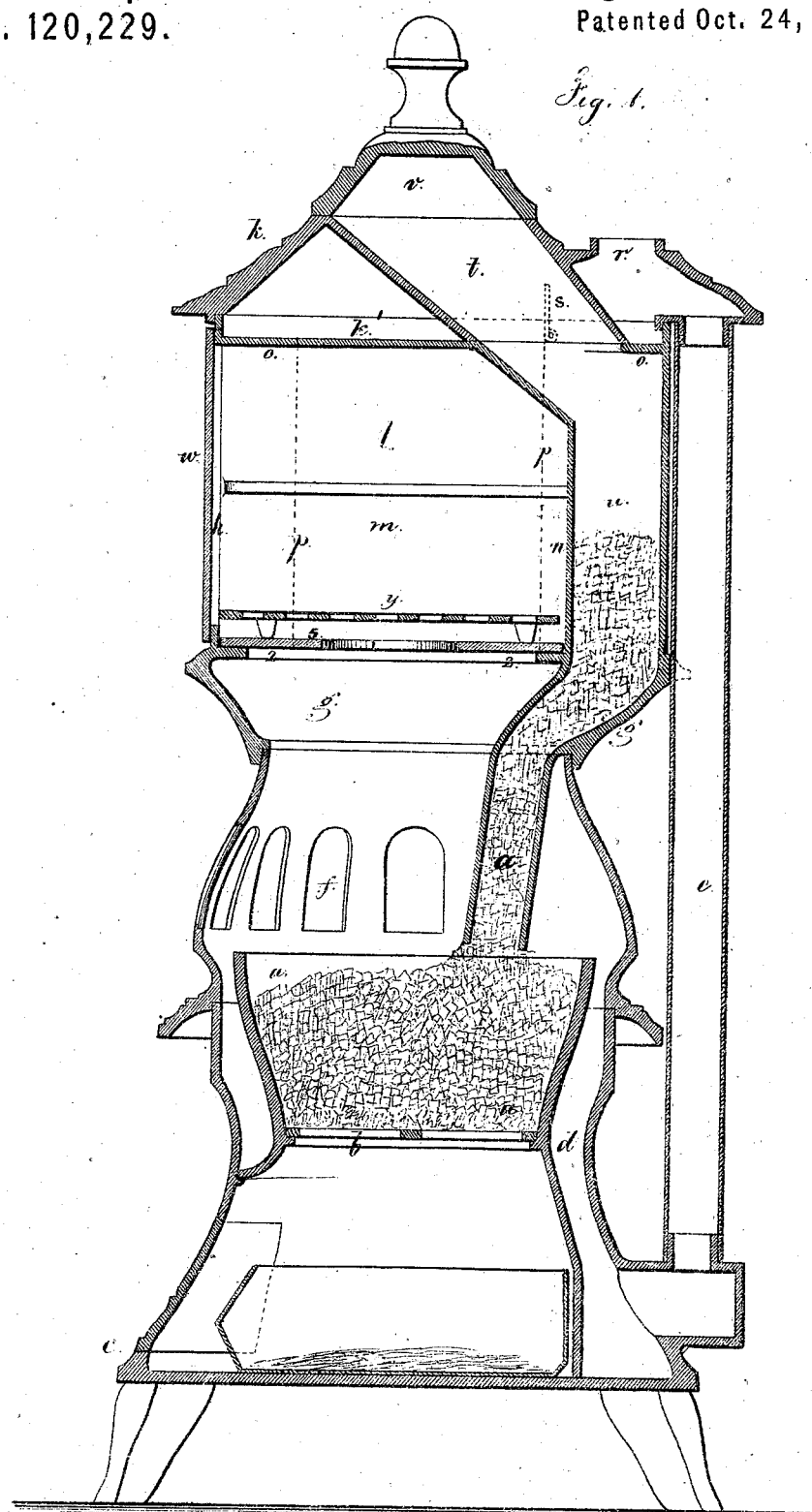

UNITED STATES PATENT OFFICE.

RODMAN BACKUS, OF ALBANY, NEW YORK.

IMPROVEMENT IN BASE-BURNING STOVES.

Specification forming part of Letters Patent No. 120,229, dated October 24, 1871.

*To all whom it may concern:*

Be it known that I, RODMAN BACKUS, of Albany, in the State of New York, have invented and made an Improvement in Base-Burning Stoves, and the following is declared to be a correct description thereof.

In this base-burning stove there is a hopper above the oven connecting with a tube conveying the fuel down to the surface of the fire. The flues are arranged so as to convey the products of combustion through the base of the stove or else up around the oven, and the bottom of the oven is made removable and contains an opening with cross-bars for supporting cooking utensils.

In the drawing, Figure 1 is a vertical section of the stove. Fig. 2 is a transverse vertical section of the oven with the removable broiler and pot-holder.

The fire-pot $a$, grate $b$, base $c$, descending-draught $d$, and vertical escape-flue $e$ are of the usual character, and do not require further description. The open-work casing $f$ and mica-windows are also as usual, and above these is the flaring-ring $g$ and exterior plates $h$ supporting the top $k$ of the stove. Within the inclosure formed by the plates $h$, top $k$, and ring $g$ is the oven $l$, having side-plates $m$, back plate $n$, and top plate $o$, so that there are flues $p$ $p$ at the sides of the oven leading from the combustion-chamber to the flue-space $k'$ over the plate $o$, and the products of combustion pass by the pipe $r$. It will now be seen that the products of combustion will pass up from the fire around the oven and off by the pipe $r$ as the most direct draught; but when the damper at $s$ is closed the products of combustion will pass away by the base $c$ $d$ of the stove and the pipe $e$, and the oven will only be kept warm. The magazine for fuel is made between the oven and its surrounding case, preferably at the back of the oven. The hopper $t$ at the upper end of the magazine $u$ passes through the upper oven-flue below the top plate $o$, and a cover, $v$, is provided for said magazine. The lower end of the magazine $u$ passes as a compound curve from behind the oven to the fire at the back part of the stove, thereby leaving the surface of the fire exposed beneath the oven. The oven is provided with doors $w$ and a movable bottom. This movable bottom may be a flat plate, 5, with a pot-hole in the middle, but I prefer the removable holder for pots or for broiling shown in Fig. 2. In this the conical or dish-formed plate $x$ is supported upon the ledges 2 2, and has an opening in the center and a basket of cross-bars, into which a pot may be placed or a gridiron or other cooking utensil may be introduced, and will be sustained near to the surface of the fire. The removable rack $y$ may be employed in the oven above this bottom $x$ in roasting or broiling, or a cover, $x'$, may be introduced for closing the bottom of the oven so that it may be employed for baking purposes.

I claim as my invention—

1. The hopper $t$, connecting with the upper end of the magazine $u$ and arranged in the manner specified, so that the hopper $t$ is in the top of the stove and over the oven and the magazine $u$ extends down to the fire-pot below the oven, as set forth.

2. A removable bottom to the oven, containing an opening and bars or grates depending below that opening for sustaining cooking utensils, as set forth.

Signed by me this 31st day of August, A. D. 1871.

RODMAN BACKUS.

Witnesses:
 JNO. W. HAYES,
 LUCIUS V. BOND. (154)